(12) United States Patent
Hwang et al.

(10) Patent No.: US 11,541,947 B2
(45) Date of Patent: Jan. 3, 2023

(54) ASSEMBLED BODY OF VEHICLE

(71) Applicants: Hyundai Motor Company, Seoul (KR); Kia Motors Corporation, Seoul (KR)

(72) Inventors: Jin Ho Hwang, Cheonan-si (KR); Dong Eun Cha, Hwaseong-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 357 days.

(21) Appl. No.: 16/898,979

(22) Filed: Jun. 11, 2020

(65) Prior Publication Data
US 2021/0245816 A1 Aug. 12, 2021

(30) Foreign Application Priority Data

Feb. 10, 2020 (KR) ......................... 10-2020-0015430

(51) Int. Cl.
*B62D 27/06* (2006.01)
*B62D 65/02* (2006.01)
*G01D 5/14* (2006.01)
*B60R 16/033* (2006.01)
*G07C 5/08* (2006.01)

(52) U.S. Cl.
CPC ............ *B62D 27/06* (2013.01); *B60R 16/033* (2013.01); *B62D 65/02* (2013.01); *G01D 5/145* (2013.01); *G07C 5/0816* (2013.01)

(58) Field of Classification Search
CPC .... B60R 16/033; B62D 27/06; B62D 63/025; B62D 65/02; G01D 5/145; G07C 5/0816
See application file for complete search history.

(56) References Cited

U.S. PATENT DOCUMENTS

| 4,332,012 A | * | 5/1982 | Sekine | G05B 19/128 209/552 |
| 10,836,306 B1 | * | 11/2020 | Dubey | B60Q 1/50 |
| 2006/0243767 A1 | * | 11/2006 | McMillan | B60R 9/04 224/318 |
| 2010/0030397 A1 | * | 2/2010 | Tachibana | B60L 15/2009 701/1 |

(Continued)

FOREIGN PATENT DOCUMENTS

| JP | 2005-255036 A | 9/2005 |
| KR | 10-1130218 B1 | 3/2012 |

(Continued)

*Primary Examiner* — Tyler J Lee
(74) *Attorney, Agent, or Firm* — Morgan, Lewis & Bockius LLP (57) ABSTRACT

An assembled body of a vehicle may include a plurality of body parts, each of which forms a portion of the vehicle body, and forming the vehicle by being assembled during combination thereof; a magnetic module provided in each of the body portions and combining the plurality of body portions with each other by use of magnetic flow of the magnetic module; and a controller engaged to the magnetic module and configured for controlling a closed circulating magnetic path produced in the magnetic module such that the plurality of body portions is combined with each other to form the assembled body or to be separated from each other according to a control signal of the controller.

14 Claims, 8 Drawing Sheets

(56) References Cited

U.S. PATENT DOCUMENTS

| | | | | |
|---|---|---|---|---|
| 2012/0139292 | A1* | 6/2012 | Hofer | B62D 65/04 |
| | | | | 296/181.1 |
| 2019/0030605 | A1* | 1/2019 | Tenhouten | B62D 21/15 |
| 2019/0030751 | A1* | 1/2019 | Czinger | B33Y 80/00 |
| 2022/0119054 | A1* | 4/2022 | Subramanian | B60S 9/02 |

FOREIGN PATENT DOCUMENTS

| | | |
|---|---|---|
| KR | 10-1427066 B1 | 8/2014 |
| KR | 10-1681765 B1 | 12/2016 |
| KR | 10-2019-0031123 | 3/2019 |
| KR | 10-2019-0031133 A | 3/2019 |
| KR | 10-2020-0005142 A | 1/2020 |
| KR | 10-2020-0010552 A | 1/2020 |

* cited by examiner

ASSEMBLED BODY OF VEHICLE

CROSS REFERENCE TO RELATED APPLICATION

The present application claims priority to Korean Patent Application No. 10-2020-0015430, filed Feb. 10, 2020, the entire contents of which is incorporated herein for all purposes by this reference.

BACKGROUND OF THE INVENTION

Field of the Invention

The present invention relates to an assembled body of a vehicle which is composed of a plurality of body parts which may be separated from or combined with each other by controlling the magnetic path of a magnetic module as required.

Description of Related Art

The concept of a traditional vehicle has been recognized as a means of transporting people or objects by driving a completed vehicle. However, with the steady development of the appearance, internal materials, and parts of a vehicle, a modern vehicle has been variously defined beyond simple transportation, and has become a portion of a living space.

As for a classic concept car, it is impossible to transform a completed vehicle or selectively replace and combine parts of a vehicle body. After purchasing a completed vehicle, it is difficult to change the appearance of the vehicle, and the appearance may be changed only by mounting parts to the vehicle.

However, as for a future vehicle, it will be possible to selectively change parts of a vehicle body of a vehicle as required, and to this end, the technology of freely and stably separating and combining parts of a vehicle body is required. As for the structure of fastening the hardware of the existing vehicle, hardware is fastened by physical combination, and thus the range of changing a vehicle is limited and stability thereof is lacking. Therefore, there is a need to develop an assembled body which is which is free to be separated, replaced, and mounted, while ensuring stability when body parts are combined.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an assembled body of a vehicle having a plurality of body parts, which is first in the world, wherein the plurality of body portions may be freely and stably separated from and combined with each other by controlling the magnetic path of a magnetic module.

According to various aspects of the present invention, there is provided an mounted body of a vehicle, the assembled body including: a plurality of body parts, each of which forms a portion of the vehicle body, and forming the vehicle by being mounted during combination thereof; a magnetic module provided in each of the body portions and combining the plurality of body portions with each other by use of magnetic flow of the magnetic module; and a controller engaged to the magnetic module and configured for controlling a closed circulating magnetic path produced in the magnetic module such that the plurality of body portions is combined with or separated from each other to form the assembled body.

The body portions may include: a first body portion forming a portion of the vehicle body and having a fixing portion provided at an end portion thereof, the fixing portion being configured as a magnetic body through which magnetism of the magnetic module flows; and a second body portion forming a portion of the vehicle body and having the magnetic module provided at an end portion thereof, wherein the controller may be configured to control the closed circulating magnetic path produced in the magnetic module and may allow the first body portion and the second body portion to be combined with or separated from each other by the fixing portion and the magnetic module to form the assembled body.

The magnetic module may include a permanent magnet and an electromagnet, each of the permanent magnet and the electromagnet being configured to be adjacent to each other in at least a portion thereof to interact magnetism occurring therefrom, and the controller may be configured to control the magnetic path of the permanent magnet by controlling the electromagnet such that the fixing portion and the magnetic module are combined with or separated from each other.

Furthermore, when the first body portion and the second body portion are combined with each other, the fixing portion and the magnetic module may be in contact with each other, and the controller may be configured to control electric current input to the electromagnet such that the electromagnet has magnetic properties of the same pole as a pole of the permanent magnet at a position adjacent to the permanent magnet so that the magnetic path of the permanent magnet is provided in the fixing portion and the magnetic module.

When the first body portion and the second body portion are separated from each other, the controller may be configured to control electric current input to the electromagnet such that the electromagnet has magnetic properties of a pole different from a pole of the permanent magnet at a position adjacent to the permanent magnet so that the magnetic path of the permanent magnet is not provided in the fixing portion.

Furthermore, the fixing portion or the magnetic module may include a Hall sensor measuring a voltage generated due to formation of a magnetic field, and the controller may be configured to determine whether the first body portion and the second body portion are incompletely combined with each other by use of value of the voltage measured by the Hall sensor.

The Hall sensor may be a first Hall sensor provided in the fixing portion, and the controller may be configured to determine that the first body portion and the second body portion are incompletely combined with each other when a value measured by the first Hall sensor is equal to or less than a first reference value when the first body portion and the second body portion are combined with each other.

Furthermore, the Hall sensor may be a second Hall sensor provided in the magnetic module, wherein the second Hall sensor may be provided at a side opposite to a position at which the fixing portion is in contact with the magnetic module, so that when the fixing portion and the magnetic module are combined with each other, the magnetic path of a permanent magnet may be provided on a path blocked by an electromagnet, and the controller may be configured to determine that the first body portion and the second body portion are incompletely combined with each other when a value measured by the second Hall sensor is at least a second reference value when the first body portion and the second body portion are combined with each other.

Furthermore, the controller may send a warning alarm when the controller is configured to determine that the first body portion and the second body portion are incompletely combined with each other The plurality of body portions may include a guide provided at a position at which each of the body portions is in contact with each other by protruding outwards therefrom, or a groove provided by being depressed inwards therefrom, so that when the plurality of body portions is combined with each other, physical combination of the guide and the groove may be performed.

Additionally, the assembled body may further include: a power supply portion supplying power to the magnetic module, wherein the power supply portion may supply power to the magnetic module by being connected to a vehicle battery or may be separately provided in each of the magnetic modules, and perform wired or wireless charging.

According to the assembled body of a vehicle of the present invention, the body portions forming the vehicle body may be separated from and combined with each other to change the configuration of the vehicle according to the purpose of using the vehicle, so that the vehicle may be converted into a vehicle for various purposes.

Furthermore, the plurality of body portions may be combined with and separated from each other by controlling the magnetic path of the magnetic module instead of physical combination, so that the configuration of the assembled body is simple and the control thereof is easy.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of an exemplary embodiment of the present invention included herein are only for illustrative purposes of the exemplary embodiment of the present invention. The present invention may be embodied in various forms without departing from the spirit and significant characteristics of the present invention. Therefore, the exemplary embodiment of the present invention is included only for illustrative purposes and may not be construed as limiting the present invention.

Reference will now be made in detail to the exemplary embodiment of the present invention, a specific example of which is illustrated in the accompanying drawings and described below, since the exemplary embodiment of the present invention may be variously modified in various forms. While the present invention will be described in conjunction with the exemplary embodiment thereof, it is to be understood that the present description is not intended to limit the present invention to the exemplary embodiment of the present invention. On the other hand, the present invention is directed to cover not only the exemplary embodiment of the present invention, but also various alternatives, modifications, equivalents and other embodiments which may be included within the spirit and scope of the present invention as defined by the appended claims.

It will be understood that, although the terms "first", "second", etc. may be used herein to describe various elements, these elements may not be limited by these terms. These terms are only used to distinguish one element from another element. For instance, a first element discussed below could be termed a second element without departing from the teachings of the present invention. Similarly, the second element could also be termed the first element.

Hereinbelow, the exemplary embodiment of the present invention will be described in detail with reference to the accompanying drawings. Throughout the drawings, the same reference numerals will refer to the same or like parts.

The present invention relates to an assembled body of a vehicle, wherein each of a plurality of body portions forming the vehicle body is separated from or combined with each other so that the vehicle may be configured according to the purpose thereof, each of the body portions being stably combined by magnetic properties of a magnetic module 210.

Figure 1:
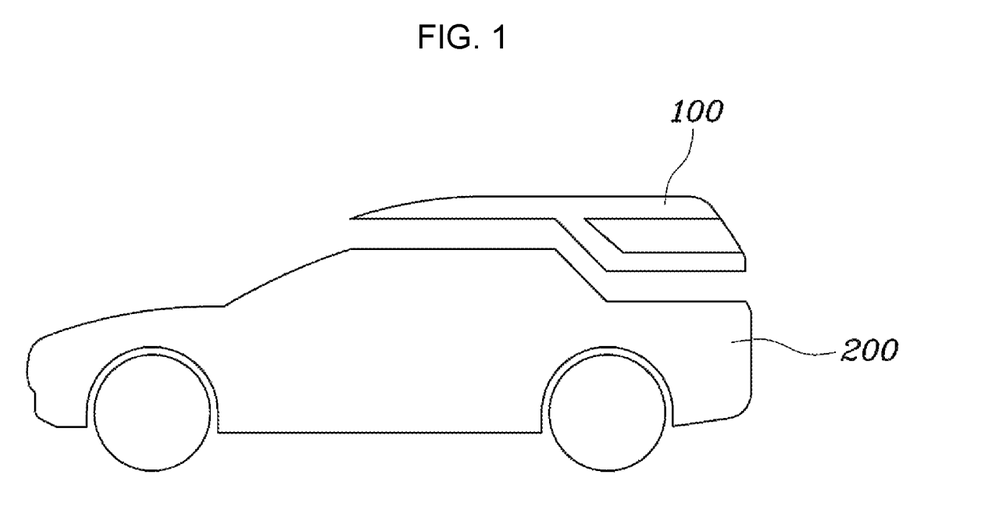
FIG. 1 is a view exemplarily illustrating the separated state of an assembled body of a vehicle according to an exemplary embodiment of the present invention.

FIG. 1 is a view exemplarily illustrating the separated state of an assembled body of a vehicle according to the exemplary embodiment of the present invention.

Referring to FIG. 1, a vehicle having the assembled body according to the exemplary embodiment of the present invention includes the plurality of body portions 100 and 200, and the plurality of body portions is combined with each other to form the assembled body. The plurality of body portions 100 and 200 are combined with and separated from each other by the magnetic module 210, the detailed mechanism for which will be described below. Although FIG. 1 illustrates a vehicle including two body parts, a vehicle may be provided with at least two body portions, and each of the body portions may be replaced as required.

Figure 2:
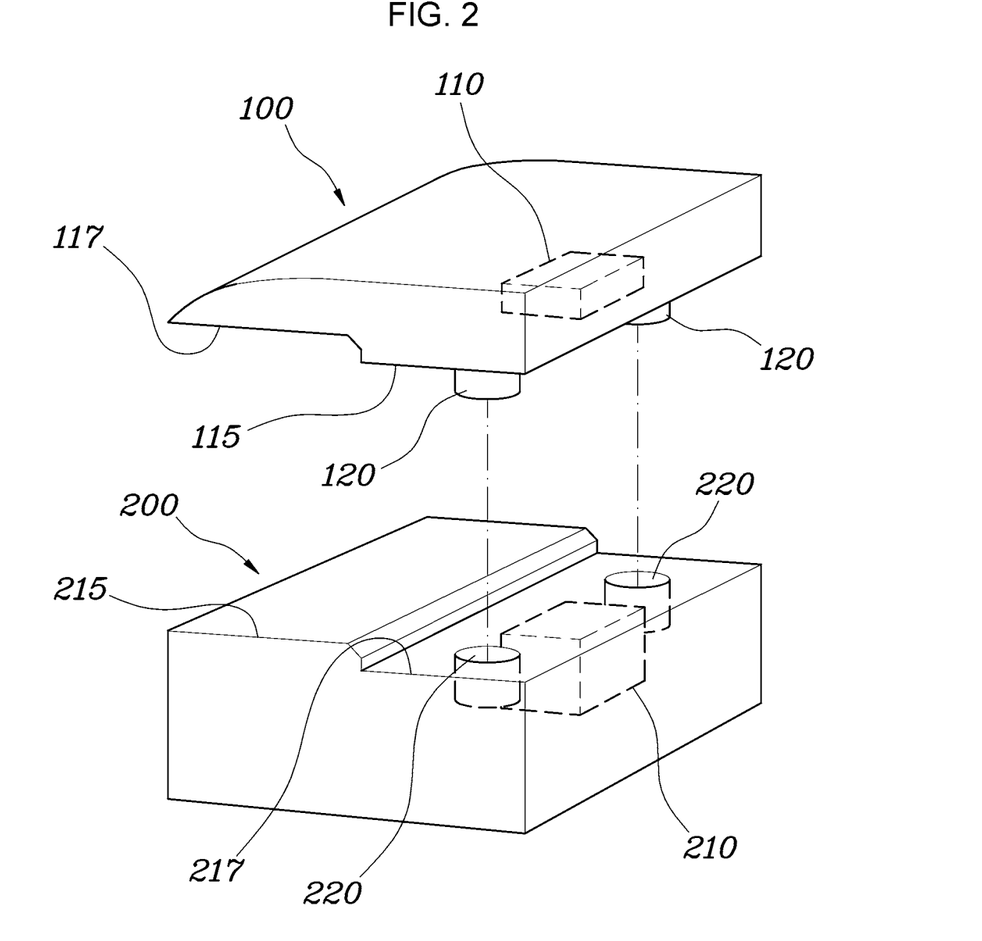
FIG. 2 is a view exemplarily illustrating a first body portion and a second body portion of the assembled body of a vehicle according to the exemplary embodiment of the present invention.

FIG. 2 is a view exemplarily illustrating a first body portion and a second body portion of the assembled body of a vehicle according to the exemplary embodiment of the present invention The first body portion 100 and the second body portion 200 illustrated in FIG. 2 are only an example and names thereof are not limited. FIG. 2 illustrates the separation of each of the body portions forming the vehicle body, and the shape, position, and specific combination order of each of the first body portion 100 and the second body portion 200 may be different.

Referring to FIG. 2, the assembled body according to the exemplary embodiment of the present invention may include the first body portion 100, the second body portion 200, and a controller.

Each of the first body portion 100 and the second body portion 200 forms a portion of the vehicle, and may form the assembled body when each of the first body portion 100 and the second body portion 200 is combined with each other. A fixing portion 110 may be provided on an end portion of the first body portion 100, and the magnetic module 210 may be provided on an end portion of the second body portion 200. The fixing portion 110 and the magnetic module 210 are portions at which the first body portion 100 and the second body portion 200 are combined with each other to be fixed, and the first body portion 100 and the second body portion 200 may be combined with each other by the closed circulating magnetic path of the magnetic module 210 as described below. When the first body portion 100 and the second body portion 200 are combined with each other, the fixing portion 110 and the magnetic module 210 are preferably provided at a position of being in contact with each other.

The fixing portion 110 may be configured as a magnetic body through which magnetism can flow. Since the fixing portion 110 and the magnetic module 210 are combined with each other by magnetic flow, the fixing portion 110 is configured as the magnetic body to be combined with or separated from the magnetic module 210 by the magnetic flow.

The magnetic module 210 is configured as a combining means combining the first body portion 100 with the second body portion 200. As illustrated in FIG. 2, the magnetic module 210 may be provided in a portion or the entirety of the plurality of body parts, and FIG. 2 illustrates the exemplary embodiment in which the magnetic module 210 is provided in the second body portion 200.

The controller can control the closed circulating magnetic path produced in the magnetic module 210. The controller is configured to control the closed circulating magnetic path produced in the magnetic module 210 such that magnetism flows through the fixing portion 110 and the magnetic module 210, so that the first body portion 100 and the second body portion 200 are combined with or separated from each other.

Figure 3A:
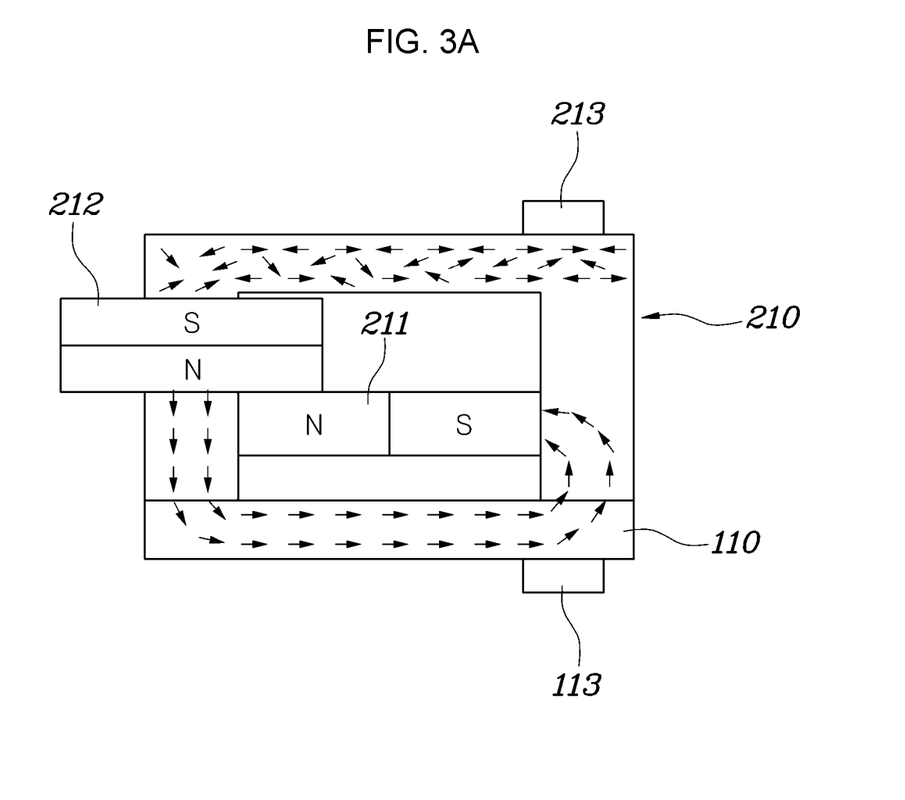
FIG. 3A and FIG. 3B are views exemplarily illustrating a fixing portion and a magnetic module when the body portions of the assembled body of a vehicle are combined with each other according to the exemplary embodiment of the present invention.
Figure 3B:
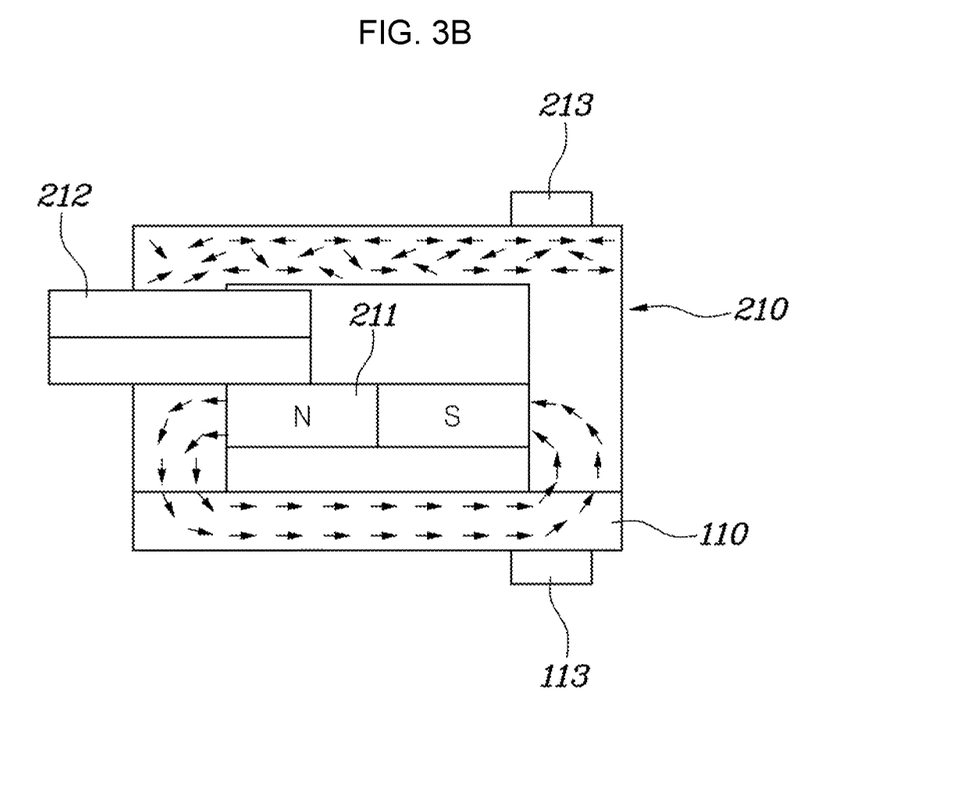
Figure 4A:
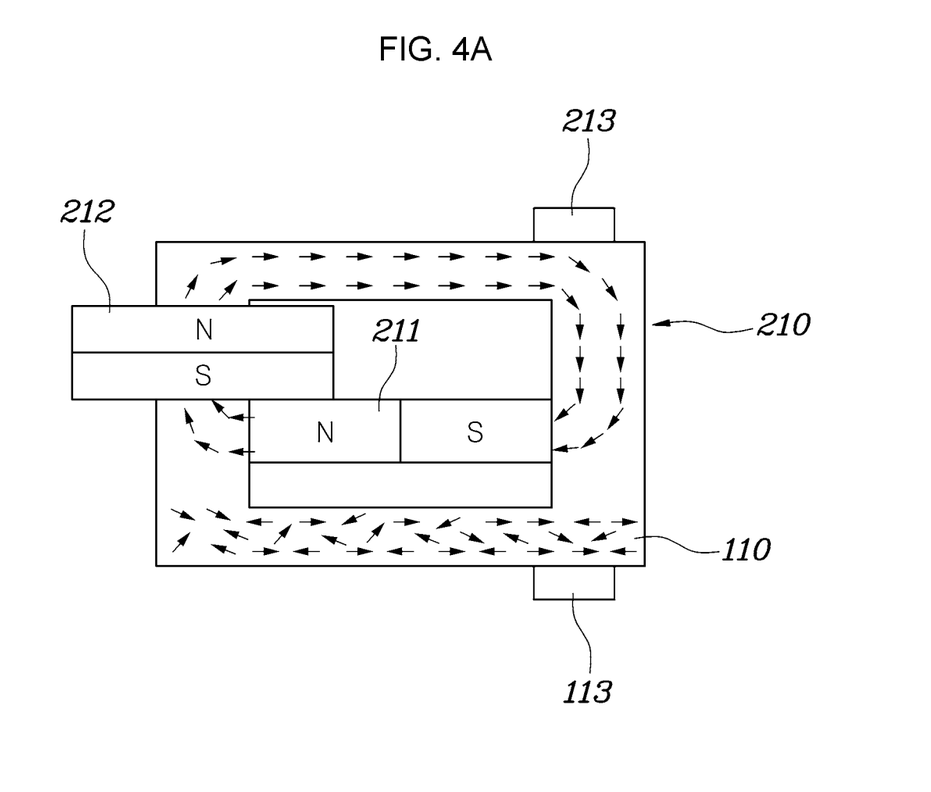
FIG. 4A and FIG. 4B are views exemplarily illustrating the fixing portion and the magnetic module when the body portions of the assembled body of a vehicle are separated from each other according to the exemplary embodiment of the present invention.
Figure 4B:
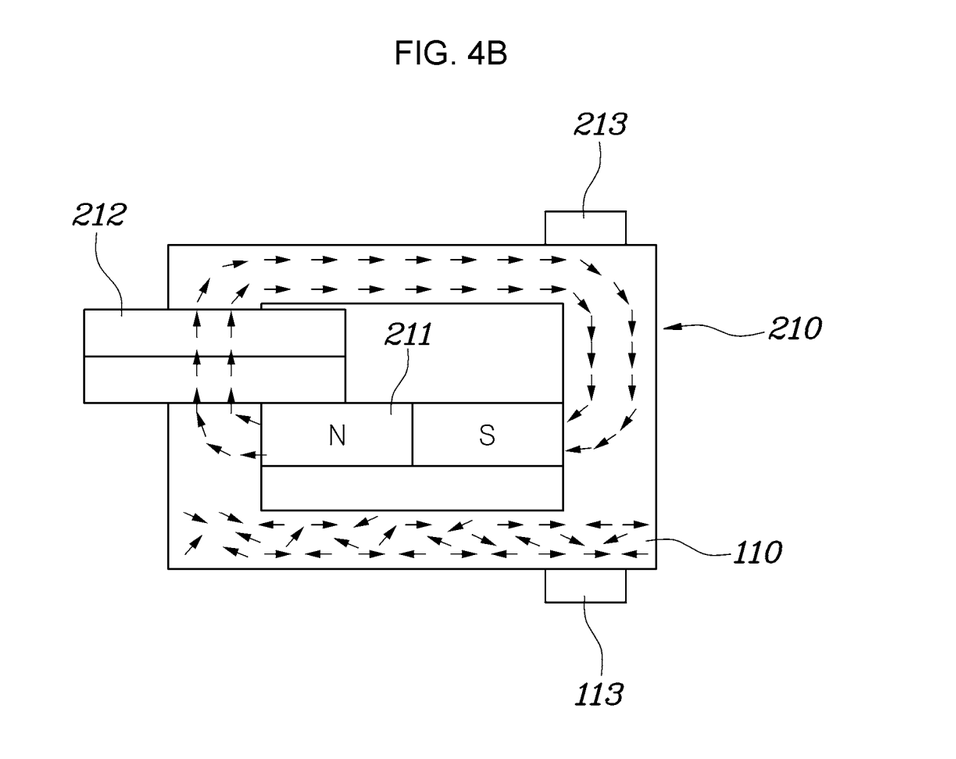

FIG. 3 is a view exemplarily illustrating the fixing portion 110 and the magnetic module 210 when the body portions of the assembled body of a vehicle are combined with each other according to the exemplary embodiment of the present invention. FIG. 4 is a view exemplarily illustrating the fixing portion 110 and the magnetic module 210 when the body portions of the assembled body of a vehicle are separated from each other according to the exemplary embodiment of the present invention. The mechanism in which the fixing portion 110 and the magnetic module 210 are combined with each other will be described with reference to FIG. 3 and FIG. 4 below.

Referring to FIG. 3A and FIG. 3B and FIGS. 4A and 4B, the magnetic module 210 may include a permanent magnet 211 and an electromagnet 212. When electric current is applied to the electromagnet 212, the directions of polarities are determined according to the direction of the electric current. Each of the permanent magnet 211 and the electromagnet 212 may be configured to be adjacent to each other in at least a portion thereof. Accordingly, magnetism occurring from each of the permanent magnet 211 and the electromagnet 212 can interact.

The controller can control poles formed in the electromagnet 212 by controlling the direction of electric current flowing through the electromagnet 212. The controller allows the electromagnet 212 to have magnetic properties of the same pole as a pole of the permanent magnet 211 adjacent thereto, and to have magnetic properties of a pole different therefrom. When the controller controls the electromagnet 212, the magnetic path of the permanent magnet 211 is controlled, whereby the fixing portion 110 and the magnetic module 210 may be combined with or separated from each other.

As illustrated in FIG. 3, when the fixing portion 110 and the magnetic module 210 are combined with each other, the controller controls electric current such that magnetic properties occur in the electromagnet 212. In the instant case, the controller controls the electromagnet 212 such that the electromagnet 212 has the magnetic properties of the same pole as a pole of the permanent magnet 211 at a position adjacent to the permanent magnet 211. Referring to FIG. 3, since the N pole of the permanent magnet 211 and the electromagnet 212 are adjacent to each other, the controller controls the electromagnet 212 such that the electromagnet 212 forms an N pole at a lower portion thereof adjacent to the permanent magnet 211 and forms an S pole at an upper portion thereof.

When electric current is applied to the electromagnet 212 such that the electromagnet 212 has polarities, magnetism flows through the permanent magnet 211 as illustrated in FIG. 3. The magnetism flows out from the N pole and enters the S pole. The N pole of the permanent magnet 211 and the N pole of the electromagnet 212 are located to be adjacent to each other, so that the magnetism flows out of the N pole of the permanent magnet 211 and flows to the fixing portion 110. The magnetism passes through the fixing portion 110 and flows to the S pole of the permanent magnet 211. In the instant case, the magnetic module 210 and the fixing portion 110 are required to be in contact with each other such that the magnetism flows through the magnetic module 210 and the fixing portion 110. Accordingly, the electromagnet 212 is required to be controlled while the first body portion 100 and the second body portion 200 are in contact with each other.

Even when no electric current flows through the electromagnet 212 after a predetermined time period has passed, the magnetic path already formed as illustrated in FIG. 3 may be maintained. Accordingly, the fixing portion 110 and the magnetic module 210 may be maintained in a combined state by the magnetic path.

When the first body portion 100 and the second body portion 200 are combined with each other, the vehicle body may be mounted by such a method. The magnetic path is formed in a form of a closed circulation path between the fixing portion 110 and the magnetic module 210, whereby the first body portion 100 and the second body portion 200 may be securely combined with each other. Even when power supply is interrupted, the force of combining the first body portion 100 with the second body portion 200 is maintained, which is advantageous in securing the stability of a structure.

As illustrated in FIGS. 4A and 4B, when the fixing portion 110 and the magnetic module 210 are separated from each other, the controller controls the electromagnet 212 such that the electromagnet 212 has the magnetic properties of a pole different from the pole of the permanent magnet 211 at a position adjacent to the permanent magnet 211. Referring to FIG. 4, since the N pole of the permanent magnet 211 and the electromagnet 212 are adjacent to each other, the controller controls the electromagnet 212 such that the electromagnet 212 forms an S pole at the lower portion thereof adjacent to the permanent magnet 211 and forms an N pole at the upper portion thereof.

When electric current is applied to the electromagnet 212 such that the electromagnet 212 has polarities, the magnetism of the permanent magnet 211 flows as illustrated in FIG. 4. Since the N pole of the permanent magnet 211 and the S pole of the electromagnet 212 are adjacent to each other, the magnetism flows out of the N pole of the permanent magnet 211 and flows to the magnetic module 210 instead of flowing to the fixing portion 110. That is, the magnetism of the permanent magnet 211 flows from the permanent magnet 211 to the magnetic module 210, but does not flow to the fixing portion 110. Accordingly, the combination of the fixing portion 110 and the magnetic module 210 is released, and the first body portion 100 and the second body portion 200 are separated from each other.

Although electric current does not flow in the electromagnet 212 even after a predetermined time period has passed, the magnetic path already formed as illustrated in FIG. 4 may be maintained. Accordingly, the fixing portion 110 and the magnetic module 210 may be maintained in a state of being separated from each other by the magnetic path.

When the first body portion 100 and the second body portion 200 are separated from each other, the controller can release the combination of the fixing portion 110 and the magnetic module 210 by controlling the electromagnet 212 as opposed to the case of combining. The control of the poles formed in the electromagnet 212 may be performed by changing the direction of electric current applied thereto, so that the configuration of the assembled body is simple and manipulation thereof is easy.

Furthermore, the assembled body according to the exemplary embodiment of the present invention may further include Hall sensors 113 and 213. Each of the Hall sensors is a device that generates a voltage in a response to a magnetic field and amplifies the generated voltage to sense, and is widely known, so a detailed description thereof will be omitted. The controller can determine whether the first body portion 100 and the second body portion 200 are incompletely combined with each other by use of the voltage measured by the Hall sensor.

The Hall sensor may be provided in the fixing portion 110 or the magnetic module 210. Hereinbelow, when describing the Hall sensor, a Hall sensor provided in the fixing portion 110 is defined as a first Hall sensor 113, and a Hall sensor provided in the magnetic module 210 is defined as a second Hall sensor 213.

The first Hall sensor 113 is provided in the fixing portion 110 and can measure a voltage in a response to the magnetic field flowing through the fixing portion 110. As described above, when the first body portion 100 and the second body portion 200 are combined with each other, the magnetic path of the permanent magnet 211 may be formed in the fixing portion 110 and the magnetic module 210. Accordingly, when the vehicle body is assembled, a voltage generated by the magnetic path of the permanent magnet 211 may be detected by the first Hall sensor 113. When the fixing portion 110 and the magnetic module 210 are completely combined with each other, the voltage value measured by the first Hall sensor 113 is defined as a first reference value.

When the combination of the fixing portion 110 and the magnetic module 210 is incomplete, the voltage measured by the first Hall sensor 113 is measured to be lower than the first reference value. This is because causes such as incomplete matching between the fixing portion 110 and the magnetic module 210, poor surface processing thereof, or foreign matter inserted to a combined position thereof may affect the magnetic path of the permanent magnet 211. During the incomplete combination, the magnetic field flowing through the fixing portion 110 decreases, and the first Hall sensor 113 detects voltage decrease caused by the decrease of the magnetic field. Accordingly, the controller is configured to determine that the fixing portion 110 and the magnetic module 210 are incompletely combined with each other when the measured value of the first Hall sensor 113 is the first reference value or less.

The second Hall sensor 213 is provided in the magnetic module 210, and can measure voltage in a response to the magnetic field flowing through the magnetic module 210. As illustrated in FIG. 3, the second Hall sensor 213 may be provided at a position opposite to a position at which the fixing portion 110 is in contact with the magnetic module 210. Accordingly, when the fixing portion 110 is combined with the magnetic module 210, the magnetic path of the permanent magnet 211 may be on a path blocked by the electromagnet 212.

When the first body portion 100 and the second body portion 200 are combined with each other, the magnetic path of the permanent magnet 211 is formed toward the fixing portion 110 by the electromagnet 212, so that the magnetic path of the permanent magnet 211 is not formed at a side opposite to the fixing portion 110. Accordingly, when the vehicle body is assembled, the second Hall sensor 213 detects a lower measured value of voltage than when the vehicle body is not assembled. When the fixing portion 110 and the magnetic module 210 are completely combined with each other, the voltage value measured by the second Hall sensor 213 is defined as a second reference value.

When the fixing portion 110 and the magnetic module 210 are incompletely combined with each other, the magnetic path of the permanent magnet 211 is not completely blocked, so voltage produced by the magnetic field of the permanent magnet 211 may be detected by the second Hall sensor 213. Accordingly, the controller may be configured to determine that the fixing portion 110 and the magnetic module 210 are incompletely combined with each other when the value measured by the second Hall sensor 213 is higher than the second reference value.

The controller is configured to determine whether the fixing portion 110 and the magnetic module 210 are incompletely combined with each other by comparing the value measured by the first Hall sensor 113 or the second Hall sensor 213 with the first reference value or the second reference value, and can send the determination as an alarm signal to warn. The alarm signal may be a visual signal displayed on a display or a sound signal transmitted through a speaker. Whether the body portions are incompletely combined with each other is easily recognized in a process of manufacturing or using a vehicle, so accidents may be prevented.

Due to the mechanism mentioned above, whether the first body portion 100 and the second body portion 200 are separated from each other may also be determined by use of the first Hall sensor 113 and the second Hall sensor 213. The first Hall sensor 113 detects a lower voltage and the second Hall sensor 213 detects an upper voltage when the vehicle body is completely disassembled than when the vehicle body is assembled.

Figure 5A:
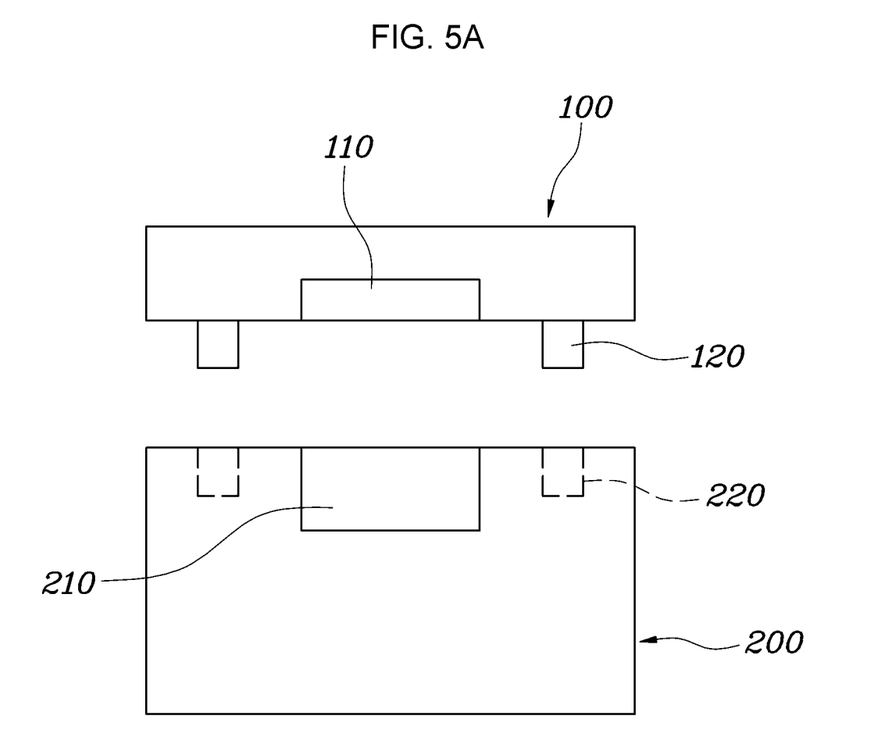
FIG. 5A and FIG. 5B are views simply illustrating the process of combining the assembled body of a vehicle according to the exemplary embodiment of the present invention.
Figure 5B:
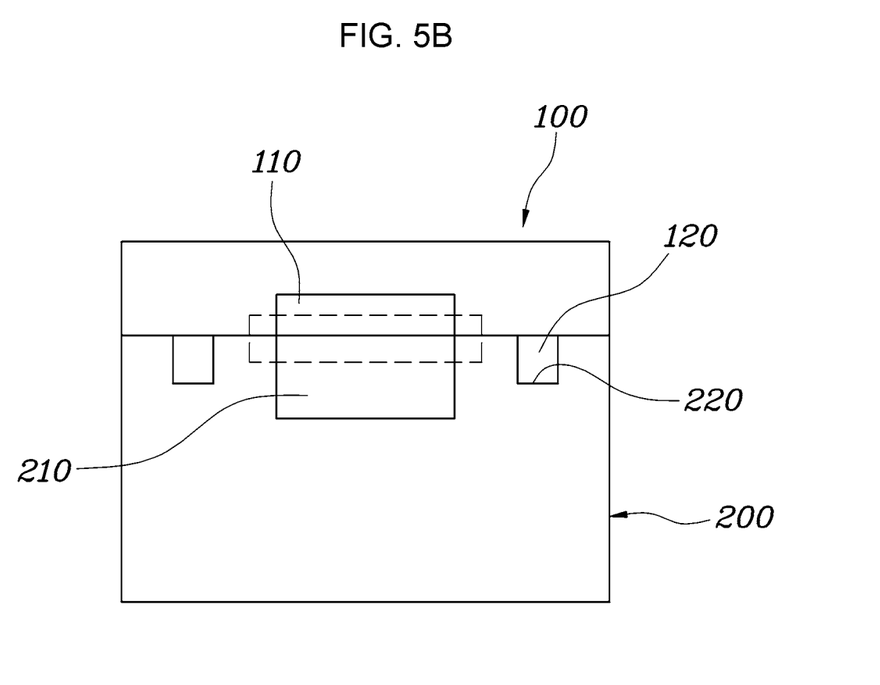

FIG. 5A and FIG. 5B are views simply illustrating the process of combining the assembled body of a vehicle according to the exemplary embodiment of the present invention.

Referring to FIGS. 1 and 5B, a guide 120 and a groove 220 may be provided in the body portions of the assembled body according to the exemplary embodiment of the present invention. The guide 120 is provided at a position at which each of the body portions is in contact with each other by protruding outwards therefrom when the plurality of body portions is combined with each other, and the groove 220 is provided by being depressed inwards therefrom. The guide 120 is inserted to and fixed in the groove 220, so that the plurality of body portions is physically combined with each other to add stability.

Referring to FIG. 5, when the first body portion 100 and the second body portion 200 are combined with each other, the guide 120 is inserted into the groove 220 to be physically combined therewith, and the fixing portion 110 and the magnetic module 210 are in contact with each other. When electric current is controlled by the controller, the magnetic path is formed between the fixing portion 110 and the magnetic module 210 and the first body portion 100 and the second body portion 200 may be securely combined with each other. The controller reverses the direction of the electric current to remove the magnetic path formed in the fixing portion 110, so that the first body portion 100 and the second body portion 200 may be separated from each other. FIG. 5 illustrates the exemplary embodiment in which the guide 120 is formed in the first body portion 100 and the groove 220 is formed in the second body portion 200, but the groove 220 and the guide 120 may be formed independently of the plurality of body parts.

Although not shown in the drawings, the assembled body of a vehicle according to the exemplary embodiment of the present invention may further include a power supply portion applying power to the magnetic module 210. The power supply portion is a device that applies power to the magnetic module 210 so that electric current flows through the electromagnet 212 and may be controlled by the controller. The power supply portion may supply power to the magnetic module 210 by being connected to a vehicle battery or by being configured to allow wired/wireless charging to be performed by being separately provided in the magnetic module 210.

In an exemplary embodiment of the present invention, the first body portion 100 includes a concave portion 117 and a protrusion portion 115 to which the guide 120 and the fixing portion 110 are mounted and the second body portion 200 includes a protrusion portion 215 and a concave portion 217 to which the groove 220 and the magnetic module 210 are mounted.

In assembling the first body portion 100 and the second body portion 200, the concave portion 117 is fit with the protrusion portion 215 and the protrusion portion 115 is fit with the concave portion 217.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An assembled body of a vehicle, the assembled body including:
   a plurality of body portions, each of which forms a portion of the vehicle body, and forming the vehicle by being assembled during combination thereof;

a magnetic module mounted in the plurality of body portions and configured of combining the plurality of body portions with each other by use of magnetic flow of the magnetic module;

a controller engaged to the magnetic module and configured for controlling a closed circulating magnetic path produced in the magnetic module so that the plurality of body portions is combined with each other to form the assembled body or to be separated from each other according to a control signal of the controller; and a power supply portion supplying power to the magnetic module, wherein the power supply portion supplies the power to the magnetic module by being connected to a vehicle battery.

2. The assembled body of claim 1, wherein the plurality of body portions includes:

a first body portion forming a first portion of the vehicle body and having a fixing portion mounted at an end portion of the first body portion, the fixing portion being configured as a magnetic body through which magnetism of the magnetic module flows; and a second body portion forming a second portion of the vehicle body and having the magnetic module mounted at an end portion of the second body portion, wherein the controller is configured to control the closed circulating magnetic path produced in the magnetic module and to selectively engage the magnetic module with the fixing portion for the first body portion and the second body portion to be combined or separated from each other.

3. The assembled body of claim 2, wherein the magnetic module includes a permanent magnet and an electromagnet to which the controller is connected, each of the permanent magnet and the electromagnet being adjacent to each other in at least a portion thereof to interact the magnetism occurring therefrom, and wherein the controller is configured to control a magnetic path of the permanent magnet by controlling the electromagnet so that the fixing portion and the magnetic module are combined with or separated from each other.

4. The assembled body of claim 3, wherein the controller is configured to control electric current input to the electromagnet so that the electromagnet has magnetic properties of a same pole as a pole of the permanent magnet at a position adjacent to the permanent magnet, the magnetic path of the permanent magnet is generated in the fixing portion and the magnetic module, and the first body portion and the second body portion are combined with each other, while the fixing portion and the magnetic module are in contact with each other.

5. The assembled body of claim 3, wherein the controller is configured to control electric current input to the electromagnet so that the electromagnet has magnetic properties of a pole different from a pole of the permanent magnet at a position adjacent to the permanent magnet so that the magnetic path of the permanent magnet is not generated in the fixing portion, and the first body portion and the second body portion are separated from each other.

6. The assembled body of claim 2, wherein the fixing portion or the magnetic module includes a Hall sensor configured for measuring a voltage generated due to formation of a magnetic field of the magnetic module, and wherein the controller is configured to determine when the first body portion and the second body portion are incompletely combined with each other by use of value of the voltage measured by the Hall sensor.

7. The assembled body of claim 6, wherein the Hall sensor is a first Hall sensor mounted in the fixing portion, and the controller is configured to determine that the first body portion and the second body portion are incompletely combined with each other when a value measured by the first Hall sensor is equal to or less than a first reference value while the first body portion and the second body portion are combined with each other.

8. The assembled body of claim 6, wherein the magnetic module includes a permanent magnet and an electromagnet to which the controller is connected, each of the permanent magnet and the electromagnet being adjacent to each other in at least a portion thereof to interact the magnetism occurring therefrom, wherein the Hall sensor is a second Hall sensor mounted in the magnetic module and the second Hall sensor is mounted at a side opposite to a position at which the fixing portion is in contact with the magnetic module, so that when the fixing portion and the magnetic module are combined with each other, a magnetic path of the permanent magnet is generated on a path blocked by the electromagnet, and wherein the controller is configured to determine that the first body portion and the second body portion are incompletely combined with each other when a value measured by the second Hall sensor is at least a second reference value when the first body portion and the second body portion are combined with each other.

9. The assembled body of claim 6, wherein the controller is configured to send a warning alarm when the controller determines that the first body portion and the second body portion are incompletely combined with each other.

10. The assembled body of claim 9, wherein the Hall sensor is a first Hall sensor mounted in the fixing portion, and the controller is configured to determine that the first body portion and the second body portion are incompletely combined with each other when a value measured by the first Hall sensor is equal to or less than a first reference value while the first body portion and the second body portion are combined with each other.

11. The assembled body of claim 9, wherein the magnetic module includes a permanent magnet and an electromagnet to which the controller is connected, each of the permanent magnet and the electromagnet being adjacent to each other in at least a portion thereof to interact the magnetism occurring therefrom, wherein the Hall sensor is a second Hall sensor mounted in the magnetic module and the second Hall sensor is mounted at a side opposite to a position at which the fixing portion is in contact with the magnetic module, so that when the fixing portion and the magnetic module are combined with each other, a magnetic path of the permanent magnet is generated on a path blocked by the electromagnet, and wherein the controller is configured to determine that the first body portion and the second body portion are incompletely combined with each other when a value measured by the second Hall sensor is at least a second reference value when the first body portion and the second body portion are combined with each other.

12. The assembled body of claim 1, wherein the plurality of body portions includes a guide mounted at a position at which each of the plurality of body portions is in contact with each other by protruding outwards therefrom, or a groove formed by being depressed inwards therefrom, so that when the plurality of body portions is combined with each other, physical combination of the guide and the groove is performed.

13. The assembled body of claim 12,
wherein a first predetermined number among the plurality of body portions includes a first concave portion and a first protrusion portion to which the guide is formed and
wherein a second predetermined number among the plurality of body portions includes a second protrusion portion and a second concave portion to which the groove is formed and the magnetic module is mounted, wherein in assembling the plurality of body portions, the first concave portion is fit with the second protrusion portion and the first protrusion portion is fit with the second concave portion.

14. An assembled body of a vehicle, the assembled body including:
a plurality of body portions, each of which forms a portion of the vehicle body, and forming the vehicle by being assembled during combination thereof;
a magnetic module mounted in the plurality of body portions and configured of combining the plurality of body portions with each other by use of magnetic flow of the magnetic module;
a controller engaged to the magnetic module and configured for controlling a closed circulating magnetic path produced in the magnetic module so that the plurality of body portions is combined with each other to form the assembled body or to be separated from each other according to a control signal of the controller; and
a power supply portion supplying power to the magnetic module,
wherein the power supply portion is separately mounted in each of the magnetic modules, and is configured to perform wired or wireless charging.

* * * * *